United States Patent [19]
Lee et al.

[11] Patent Number: 6,151,574
[45] Date of Patent: Nov. 21, 2000

[54] TECHNIQUE FOR ADAPTATION OF HIDDEN MARKOV MODELS FOR SPEECH RECOGNITION

[75] Inventors: Chin-Hui Lee, Basking Ridge, N.J.; Koichi Shinoda, Chiba, Japan

[73] Assignee: Lucent Technologies Inc., Murray Hill, N.J.

[21] Appl. No.: 09/149,782

[22] Filed: Sep. 8, 1998

Related U.S. Application Data

[60] Provisional application No. 60/067,822, Dec. 5, 1997.
[51] Int. Cl.[7] .................................................... G10L 15/14
[52] U.S. Cl. ........................................... 704/256; 704/243
[58] Field of Search .................................. 704/243, 244, 704/245, 256; 382/178–185

[56] References Cited

U.S. PATENT DOCUMENTS

| | | | |
|---|---|---|---|
| 5,027,406 | 6/1991 | Roberts et al. | 704/244 |
| 5,657,424 | 8/1997 | Farrell et al. | 704/255 |
| 5,737,487 | 4/1998 | Bellegarda et al. | 704/250 |
| 5,787,394 | 7/1998 | Bahl et al. | 704/238 |
| 5,794,197 | 8/1998 | Alleva et al. | 704/255 |
| 5,797,123 | 8/1998 | Chou et al. | 704/256 |
| 5,857,169 | 1/1999 | Seide | 704/256 |
| 5,907,825 | 5/1999 | Tzirkel-Hancock | 704/243 |
| 5,912,989 | 6/1999 | Watanabe | 382/228 |
| 5,933,806 | 8/1999 | Beyerlein et al. | 704/256 |
| 5,956,676 | 9/1999 | Shinoda | 704/244 |
| 5,960,395 | 9/1999 | Tzirkel-Hancock | 704/241 |
| 5,983,180 | 11/1999 | Robinson | 704/254 |

OTHER PUBLICATIONS

J. Chien et al., "Improved Bayesian Learning of Hidden Markov Models for Speaker Adaptation," *Proc. ICASSP–97*, 1997, pp. 1027–1030.

K. Shinoda et al., "Speaker Adaptation with Autonomous Model Complexity Control by MDL Principle," *Proc. ICASSP–96*, 1996, pp. 717–720.

J. Gauvain et al., "Maximum a Posteriori Estimation for Multivariate Gaussian Mixture Observations of Markov Chains," *IEEE Transactions on Speech and Audio Processing*, vol. 2, No. 2, Apr. 1994, pp. 291–298.

C. Lee et al., "A Study on Speaker Adaptation of the Parameters of Continuous Density Hidden Markov Models," *IEEE Transactions on Signal Processing*, vol. 39, No. 4, Apr. 1991, pp. 806–814.

Boulianne et al, "Optimal tying of HMM densities using decision trees", Spoken Language, Oct. 1996.

Miglietta, "Bayesian Adaptation of speech Recognizers to Field Speech Data", Oct. 1996.

Jen–Tzung Chen, Chin–Hui Lee, and Hsiao–Chuan Wang, A Hybrid Algorithm for Speaker Adaption Using MAP.

(List continued on next page.)

*Primary Examiner*—Krista Zele
*Assistant Examiner*—Michael N. Opsasnick

[57] ABSTRACT

A speech recognition system learns characteristics of speech by a user during a learning phase to improve its performance. Adaptation data derived from the user's speech and its recognized result is collected during the learning phase. Parameters characterizing hidden Markov Models (HMMs) used in the system for speech recognition are modified based on the adaptation data. To that end, a hierarchical structure is defined in an HMM parameter space. This structure may assume the form of a tree structure having multiple layers, each of which includes one or more nodes. Each node on each layer is connected to at least one node on another layer. The nodes on the lowest layer of the tree structure are referred to as "leaf nodes." Each node in the tree structure represents a subset of the HMM parameters, and is associated with a probability measure which is derived from the adaptation data. In particular, each leaf node represents a different one of the HMM parameters, which is derivable from the probability measure associated with the leaf node. This probability measure is a function of the probability measures which are associated with the nodes connected to the leaf node, and which represent "hierarchical priors" to such a probability measure.

38 Claims, 3 Drawing Sheets

OTHER PUBLICATIONS

Transformation and Adaption, XP-002130508, IEEE Signal Processing Letters, pp. 167–169, vol. 4, No. 6, Jun. 1997.

Carmelo Giammarco Miglietta, Chafic Mokbel, Denis Jouvet and Jean Monne, Bayesian Adaption of Speech Recognizers to Field.

Speech Data, XP-002130507, ICSLI96, pp. 917–920, Oct. 1996, Lannion cedex, France.

Douglas B. Paul, "Extensions to Phone–State Decision–Tree Clustering:Single Tree and Tagged Clustering", XP-000822740, pp. 1487–1490, Apr. 21, 1997, Newton, Massachusettes, USA.

Koichi Shinoda adn Chin–Hui Lee, "Structural MAP Speaker Adaption Using Hierarchical Priors", XP-002130506, pp. 381–388, Dec. 1997, Murray Hill, New Jersey, USA.

TECHNIQUE FOR ADAPTATION OF HIDDEN MARKOV MODELS FOR SPEECH RECOGNITION

This application claims the benefit of U.S. Provisional No. 60/067,822 filed Dec. 5, 1997.

FIELD OF THE INVENTION

The invention relates to speech recognition systems and methods, and more particularly to systems and methods for recognizing speech based on hidden Markov models (HMMs), which are adapted to acoustic inputs during a learning phase of speech recognition.

BACKGROUND OF THE INVENTION

In communication, data processing and similar systems, a user interface using audio facilities is often advantageous especially when it is anticipated that the user would be physically engaged in an activity (e.g., driving a car) while he/she is operating one such system. Techniques for recognizing human speech in such systems to perform certain tasks have been developed.

In accordance with one such technique, input speech is analyzed in signal frames, represented by feature vectors corresponding to phonemes making up individual words. The phonemes are characterized by hidden Markov models (HMMs), and a Viterbi algorithm is used to identify a sequence of HMMs which best matches, in a maximum likelihood sense, a respective concatenation of phonemes corresponding to an unknown, spoken utterance.

It is well known that each HMM comprises model parameters, e.g., mixture components which are characterized by Gaussian distributions. In a learning phase in a speech recognition system, the HMMs are adapted to input speech by a user to adjust to the particular speech characteristics of the user, thereby increasing accuracy of the speech recognition. In prior art, two well known approaches for adaptation of HMMs, namely, the Bayesian adaptation approach and the transformation based approach, have been employed.

According to the Bayesian adaptation approach, prior distributions are assumed for the model parameters in HMMs, and the maximum a posteriori (MAP) estimates for the model parameters are calculated. For details on this approach, one may refer to: C. Lee et al., "A study on Speaker Adaptation of the Parameters of Continuous Density Hidden Markov Models," *IEEE Transactions on Signal Processing*, Vol. 39, No. 4, April 1991, pp. 806–814; and J. Gauvain et al., "Maximum a Posteriori Estimation for Multivariate Gaussian Mixture Observations of Markov Chains," *IEEE Transactions on Speech and Audio Processing*, Vol. 2, No. 2, 1994, pp. 291–298. Since the Bayesian adaptation approach utilizes the MAP estimates based on knowledge of prior distributions, it requires less input speech data for the adaptation than, e.g., one utilizing maximum likelihood (ML) estimates which does not rely on any such knowledge.

However, if the adaptation data is scarce, the transformation based approach may be more effective than the Bayesian adaptation approach to adapt the HMMs. According to the transformation based approach, a transformation, e.g., a shift or an affine transformation, is defined in an acoustic feature space, also known as an "HMM parameter space," to explore correlations between different HMMs, and such correlations help adapt the HMMs despite the scarcity of the adaptation data. Parameters characterizing the transformation are estimated using the adaptation data. In implementing the transformation based approach, it is desirable to divide the acoustic feature space into a number of subspaces and estimate the transformation parameters in each subspace. However, the performance of speech recognition using the transformation based approach does not significantly improve with an increasing amount of adaptation data as any improvement is restricted by the limited number of variable transformation parameters used in the approach.

An attempt to combine the Bayesian adaptation approach with the transformation based approach to improve the speech recognition performance has been made. This attempt is described in: Chien et al., "Improved Bayesian Learning of Hidden Markov Models for Speaker Adaptation," *ICASSP*-97, 1997, pp. 1027–1030. However, the success of such an attempt relies on the requirement that the number of subspaces in the acoustic feature space be optimized for various amounts of adaptation data, which is usually impractical.

Accordingly, there exists a need for combining the Bayesian adaptation approach with the transformation based approach in a feasible manner to improve the speech recognition performance, regardless of the amount of available adaptation data.

SUMMARY OF THE INVENTION

In accordance with the invention, the HMMs in a speech recognition system are adapted during a learning phase using a "structural maximum a posteriori (SMAP)" approach. According to this inventive approach, a hierarchical structure, e.g., a tree structure, having multiple levels is constructed in an HMM parameter space. Such a structure is characterized by transformation parameters associated with different levels of the structure. The transformation parameters associated with a level represent prior knowledge, referred to as "hierarchical priors," for the transformation parameters associated with the levels therebeneath. The transformation parameters associated with each level of the structure are estimated based on the adaptation data, and hierarchical priors from the levels thereabove. The HMM parameters are updated based on the transformation parameters associated with the lowest level of the structure, which thus are a function of at least the transformation parameters associated with a level other than the lowest level.

Advantageously, given an amount of available adaptation data, the inventive SMAP approach effectively combines the Bayesian adaptation approach, characterized by use of the aforementioned hierarchical priors, with the transformation based approach, characterized by use of the aforementioned hierarchical structure, to synergistically effect the adaptation of HMMs.

DETAILED DESCRIPTION

Figure 1:
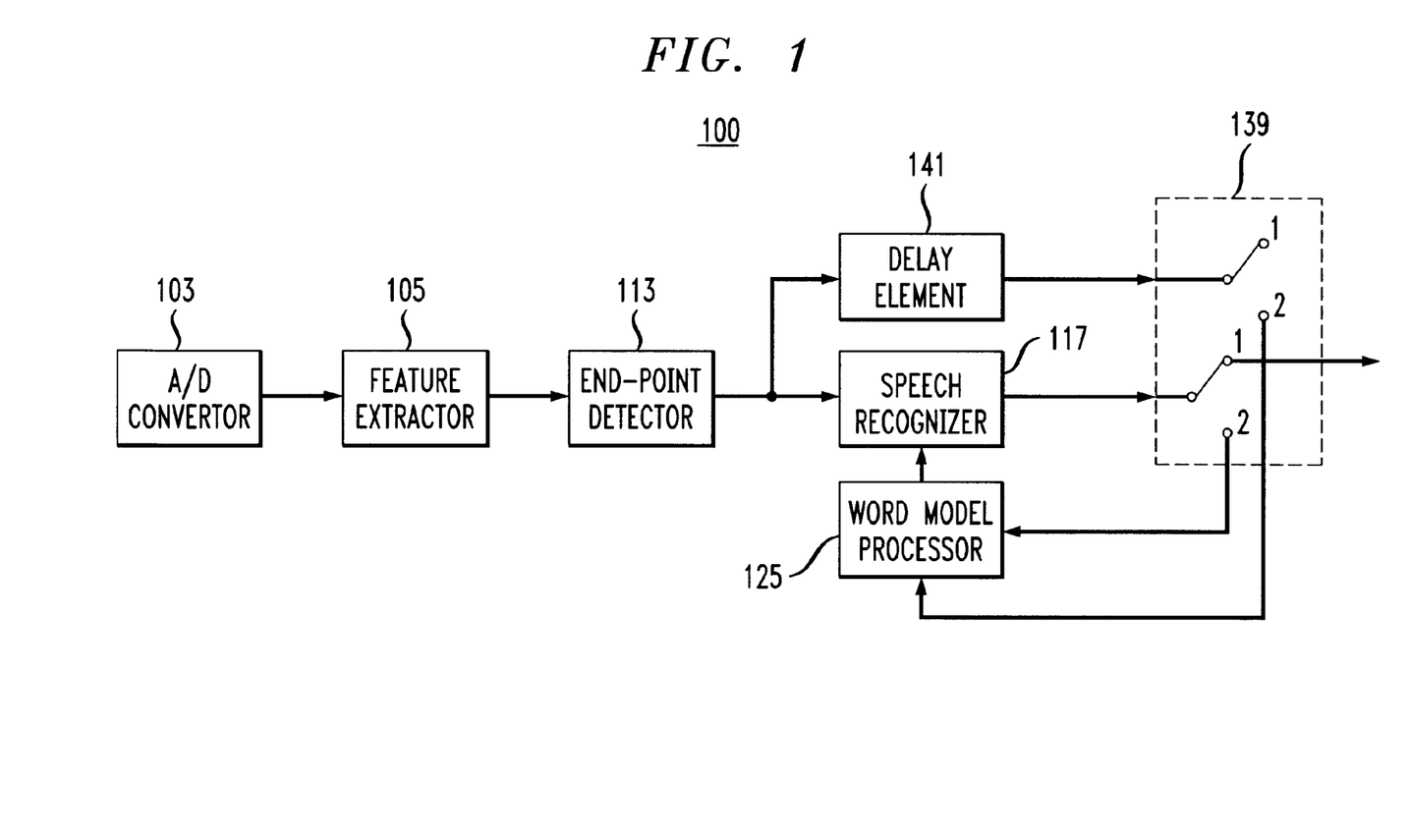
FIG. 1 is a block diagram of a speech recognition system in accordance with the invention.

FIG. 1 illustrates speech recognition system 100 embodying the principles of the invention. As shown in FIG. 1, system 100 includes a number of functional blocks including analog-to-digital (A/D) convertor 103, feature extractor 105, end-point detector 113, speech recognizer 117, word model processor 125, switch 139 and delay element 141. The functionality of each block of system 100 may be performed by a respective different processor, or the functionality of several or all blocks may be performed by the same processor. Furthermore, each stage can include multiple processing elements. The stages are pipelined and their operations are performed in a synchronous manner.

Specifically, input speech including a sequence of spoken words is provided, through a microphone (not shown), to A/D convertor 103 in system 100. Convertor 103 in a conventional manner samples the input speech. The digital samples are then provided to feature extractor 105.

Upon receiving the digital samples, feature extractor 105 organizes the received samples in speech frames of, say, 20 ms long, and derives for each frame a measure of energy in the frame and a set of short spectrum vectors, e.g., linear-predictive-coding (LPC) parameters. In this instance, the LPC parameters specify a spectrum of an all-pole model which best matches the signal spectrum over a period of time in which the frame of speech samples are accumulated. Based on the LPC parameters, extractor 105 produces a feature vector per frame, which comprises, for example, twelve cepstral features, twelve delta-cepstral features and a delta-energy feature. In a well-known manner, these cepstral and delta-cepstral features characterize the spectrum and its time variation of the speech frame. The delta-energy feature indicates an amount of change in energy in the speech frame from the previous frame.

End-point detector 113 of conventional design uses the delta energy feature, in conjunction with the energy measure by feature extractor 105, to determine the beginning and end of a speech signal. It then passes data signals containing the 25 features in each feature vector onto speech recognizer 117 of conventional design, along with any end-point determinations. Based on such data signals and word models provided by word model processor 125 in accordance with the invention, recognizer 117 determines what the spoken words are.

Processor 125, among other things, provides hidden Markov models (HMMs), e.g., continuous density (CD) HMMs in this instance, for various spoken words. Based on the Viterbi algorithm, recognizer 117 identifies an optimum sequence of CDHMMs which best matches, in a maximum likelihood sense, a respective concatenation of phonemes corresponding to an unknown spoken utterance. Such an identification process is realized by dynamic programming in a conventional manner.

It should be noted at this point that system 100 operates in two modes, namely, a learning mode and a normal operation mode. In the normal operation mode, which is the current mode, switch 139 is set at a first position to relay a series of recognized words from recognizer 117 to the output of system 100.

During the manufacture of system 100, all of the model parameters of the CDHMMs in processor 125 are predefined in a conventional manner using training data representing samples of speech from many speakers. However, when a user initially uses system 100 for speech recognition, system 100 undergoes the learning mode where the CDHMMs are adapted to the user's input speech to adjust to his/her particular speech characteristics, thereby further increasing the recognition accuracy of system 100.

In implementing unsupervised learning in this instance, switch 139 is set at a second position in the learning mode to feed the series of recognized words from recognizer 117 back to processor 125, and the input speech corresponding to the recognized words. According to the unsupervised learning, the input speech is uncontrolled and the user is not restricted to speak only certain words as in supervised learning. In the learning mode, delay element 141 imparts a proper amount of delay to the input of recognizer 117 representing the input speech to synchronize it with the corresponding recognized words. Processor 125 uses the input of recognizer 117 and the corresponding recognized words as "adaptation data" to adapt the CDHMMs therein.

In accordance with the invention, the HMMs in a speech recognition system, e.g., system 100, are adapted during the learning phase using a "structural maximum a posteriori (SMAP)" approach. According to this inventive approach, a hierarchical structure, e.g., a tree structure, having multiple levels is constructed in an HMM parameter space, also known as an "acoustic feature space." Such a structure is characterized by transformation parameters associated with different levels of the structure. The transformation parameters associated with a level represent prior knowledge, referred to as "hierarchical priors," for the transformation parameters associated with the levels beneath, or subordinate to, that level. The transformation parameters associated with each level of the structure are estimated based on the adaptation data, and aggregate hierarchical priors from the levels thereabove. The estimated transformation parameters associated with the lowest level of the hierarchical structure are used to update the HMM parameters in the learning phase. As a result, such updated HMM parameters are a function of a combination of all of the transformation parameters connected to the structure, which are weighted according to the respective levels associated therewith. The weight for each level varies with the amount of adaptation data used. The updated HMM parameters are used by processor 125 in system 100 to provide the HMMs, in particular, CDHMMs, during its normal operation mode for speech recognition as described before.

In order to fully appreciate the adaptation of HMMs in accordance with the invention, a normalization technique which simplifies the adaptation will now be described. Let $G=\{g_m; =1, \ldots, M\}$ and be the set of all mixture components of the CDHMMs in processor 125, where M represents the total number of mixture components in all the states of all the CDHMMs in processor 125, and $g_m$ represents a normal density function for a mixture component m. This normal density function is denoted $N(X|\mu_m, S_m)$, where $\mu_m$ represents a means vector and $S_m$ represents a covariance matrix.

Let $X=\{x_1, \ldots, x_t, \ldots, x_T\}$ and denote a set of T given observation vectors, which represents the adaptation data. In the normalization, each sample vector $x_t$ is transformed into a vector $y_{mt}$ for each mixture component m as follows:

$$y_{mt}=S_m^{-\frac{1}{2}}(x_t-\mu_m), \quad [1]$$

where $t=1, \ldots, T$ and $m=1, \ldots, M$.

As mentioned before, all of the CDHMM parameters here have been predefined in a conventional manner using training data derived from samples of speech from many speakers during the manufacture of system 100. Where there is no mismatch between the training data and adaptation data, it is apparent that the probability density function (pdf) for $Y_m=\{y_{m1}, \ldots, y_{mt}, \ldots, y_{mT}\}$ may be represented by the standard normal distribution $N(Y|O,I)$, where O represents a vector whose components have zero values, and I represents an identity matrix. Otherwise, where there is a mismatch between the training data and adaptation data, the pdf for $Y_m$ may be generically represented by $N(Y|v, \eta)$, where $v \neq 0$ and $\eta \neq I$. A "mismatch pdf" is defined below to represent the differences between the acoustic characteristics depicted by the training data and those depicted by the adaptation data. It can be shown that the number of mismatch pdfs required to model the acoustic differences is smaller than that of the pdfs for mixture components of HMMs.

Thus, to reduce the number of required pdfs, the set of mixture components, G, is divided into more than one subset $G_p$, $1 \leq p \leq \mathcal{P}$, where $\mathcal{P}$ is the total number of subsets which is smaller than the total number of mixture components, i.e., M. A common mismatch pdf $h_p = N(Y|v_p, \eta_p)$ is shared by all the mixture components in each subset $G_p$. In the following discussion, each mixture component g in subset $G_p$ is renumbered as $g_1^{(p)}, \ldots, g_m^{(p)} \ldots, g_{M_p}^{(p)}$, where $M_p$ represents the number of mixture components in subset $G_p$. The observed vector sequence $X = \{x_1, \ldots, x_T\}$ is normalized to $X = \{y_{m1}^{(p)}, \ldots, y_{mT}^{(p)}\}$ for mixture components $g_m^{(p)}$.

The parameters for the mismatch pdfs are estimated using the well known estimation-maximization (EM) algorithm. When the transition probabilities and the mixture component weight coefficients are specified, the auxiliary function Q for the HMM parameters is given by:

$$Q(\hat{\theta}, \theta) = \sum_{t=1}^{T} \sum_{p=1}^{\mathcal{P}} \sum_{m=1}^{M_p} \gamma_{mt}^{(p)} \log g_m^{(p)}(x_t | \hat{\mu}_m^{(p)}, \hat{S}_m^{(p)}),$$ [2]

where $\theta = \{\mu_m^{(p)}, S_m^{(p)}; m=1, \ldots, M_p \text{ and } p=1, \ldots, \mathcal{P}\}$ representing the current HMM parameter set; $\hat{\theta} = \{\hat{\mu}_m(p), \hat{S}_m^{(p)}; m=1, \ldots M_p \text{ and } p=1, \ldots \mathcal{P}\}$ representing the HMM parameter set to be estimated; and $\gamma_{mt}^{(p)}$ represents the posterior probability of using mixture component $g_m^{(p)}$ at time t. The relation between the HMM parameters and the mismatch pdf parameters is established as follows:

$$g(x_t | \hat{\mu}_m^{(p)}, \hat{S}_m^{(p)}) = \frac{h(y_{mt}^{(p)} | v_p, \eta_p)}{|J_m^{(p)}|}$$ [3]
$$= \frac{h(y_{mt}^{(p)} | v_p, \eta_p)}{|(S_m^{(p)})^{1/2}|},$$

where $J_m^{(p)} = (S_m^{(p)})^{1/2}$ representing the Jacobian matrix for the normalization expressed in [1]. Based on expression [3], the auxiliary function may be modified as follows:

$$Q(\hat{\theta}, \theta) = \sum_{t=1}^{T} \sum_{p=1}^{P} \sum_{m=1}^{M_p} \gamma_{mt}^{(p)} \log \frac{h(y_{mt}^{(p)} | v_p, \eta_p)}{|(S_m^{(p)})^{1/2}|}.$$ [4]

By differentiating function [4], the maximum likelihood (ML) estimates of the mismatch pdf parameters can be defined as follows:

$$\tilde{v}_p = \frac{\sum_{t=1}^{T} \sum_{m=1}^{M_p} \gamma_{mt}^{(p)} y_{mt}^{(p)}}{\sum_{t=1}^{T} \sum_{m=1}^{M_p} \gamma_{mt}^{(p)}},$$ [5]

$$\tilde{\eta}_p = \frac{\sum_{t=1}^{T} \sum_{m=1}^{M_p} \gamma_{mt}^{(p)} (y_{mt}^{(p)} - \tilde{v}_p)(y_{mt}^{(p)} - \tilde{v}_p)^T}{\sum_{t=1}^{T} \sum_{m=1}^{M_p} \gamma_{mt}^{(p)}},$$ [6]

where $(y_{mt}^{(p)} - \tilde{v}_p)^T$ represents the transpose of $(y_{mt}^{(p)} - \tilde{v}_p)$. Using these mismatch pdf parameters, the corresponding HMM parameters can be updated as follows:

$$\hat{\mu}_m^{(p)} = \mu_m^{(p)} + (S_m^{(p)})^{1/2} \tilde{v}_p,$$ [7]

$$\hat{S}_m^{(p)} = \eta_p S_m^{(p)},$$ [8]

where $\hat{\mu}_m^{(p)}$ and $\hat{S}_m^{(p)}$ represent the updated mean and covariance, respectively.

The optimal number of mismatch pdfs for deriving the corresponding HMMs varies with the amount of available adaptation data. We have recognized that a methodology which utilizes the mismatch pdf parameters as transformation parameters for constructing the aforementioned hierarchical structure, and which takes advantage of both its entire structure and sub-structures is preferable to achieve a good speech recognition performance with any given amount of adaptation data. To that end, a tree structure for the set G is realized in accordance with the invention.

Figure 2:
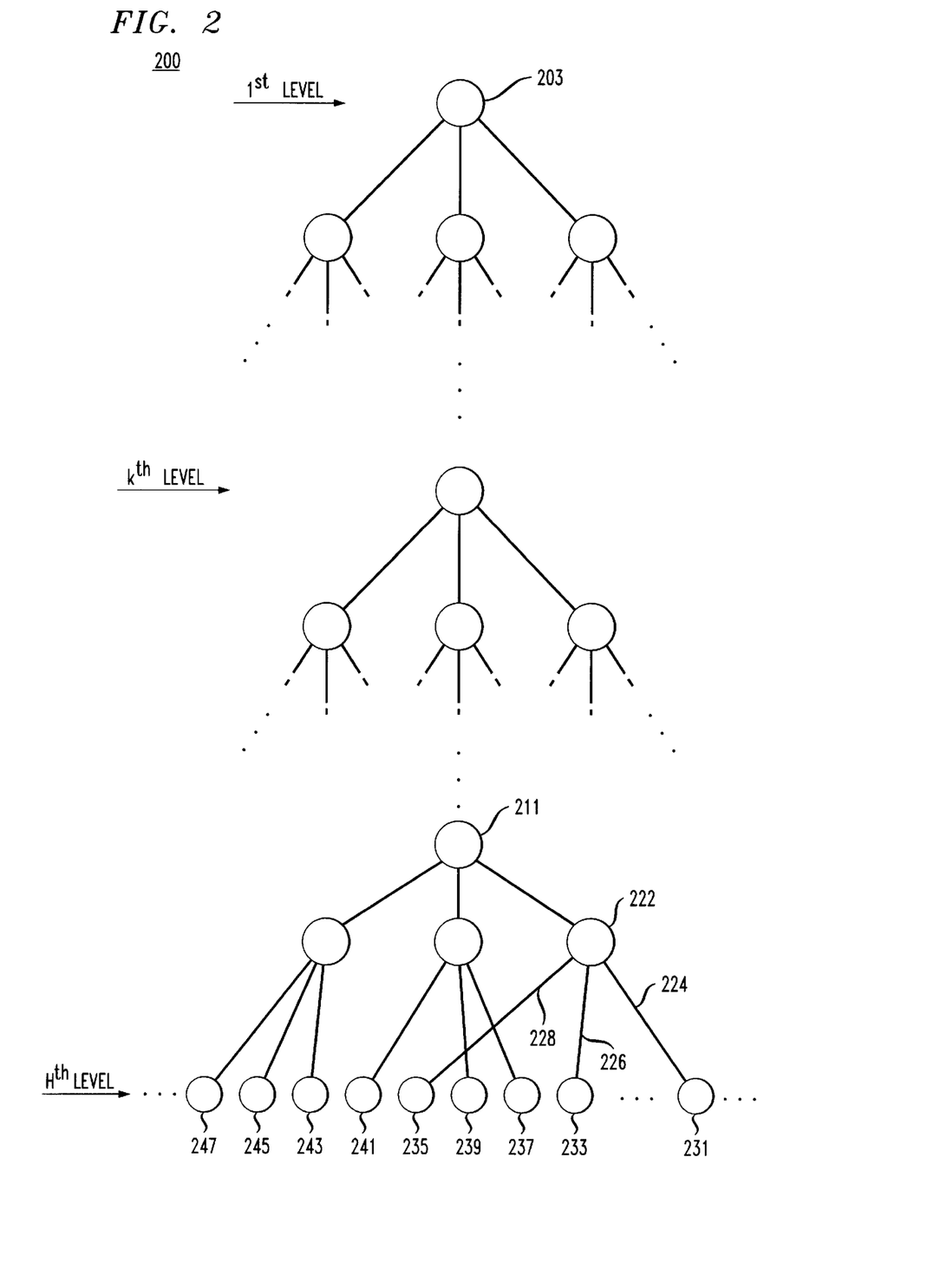
FIG. 2 illustrates a hierarchical structure whereby HMMs in the system of FIG. 1 are adapted during its learning phase.

FIG. 2 illustrates one such tree structure, denoted 200. As shown in FIG. 2, tree structure 200 has H levels, where H is an integer greater than zero. The first level of structure 200 consists of root node 203 which represents the set G containing all M mixture components of the CDHMMs. The $H^{th}$ level of structure 200 consists of M leaf nodes representing the M mixture components of the CDHMMs, respectively. Each intermediate node or non-terminal node between the first level and the $H^{th}$ level represents a subset of G, i.e., $G_p$, containing $M_p$ mixture components respectively represented by those $M_p$ leaf nodes or terminal nodes on the $H^{th}$ level which are subordinate to the intermediate node. A leaf node is said to be subordinate to an intermediate node if the leaf node "emanates" from that intermediate node, or in other words its origin can be traced back to that intermediate node through intervening paths. For example, in structure 200, the leaf nodes which are subordinate to intermediate node 222 are leaf nodes 231, 233 and 235 as they are connected to node 222 through paths 224, 226 and 228, respectively. Similarly, the leaf nodes which are subordinate to intermediate node 211 are leaf nodes 231, 233, 235, 237, 239, 241, 243, 245 and 247. Of course, root node 203 has each leaf node on the $H^{th}$ level subordinate thereto. The methodology for constructing structure 200 is described in detail below.

For each node N in tree structure 200, a mismatch pdf, which is shared by the mixture components in $G_p$ represented by the node, is assigned thereto. Specifically, for each node N, the ML estimates of the mismatch pdf parameters, $\tilde{v}_p$ and $\tilde{\eta}_p$, are determined using the adaptation data based on expressions [5] and [6].

Without loss of generality, let's estimate the parameter set $\theta_m = (\mu_m, S_m)$ for each mixture component m in G. For the sake of convenience, it should be noted that in the ensuing discussion, the subscript "m" of each variable associated with the mixture component m is dropped except where a confusion may arise without such a subscript. In tree structure 200, each sequence of connected nodes with one node from each level, including root node 203 and a leaf node, corresponds to a mixture component represented by the leaf node. Let the sequence of connected nodes corresponding to the mixture component m be denoted $\{N_1, \ldots, N_k, \ldots, N_H\}$, where $N_1$ denotes root node 203; $N_k$ denotes one of the intermediate nodes in the sequence; and $N_H$ denotes the leaf node representing the mixture component m.

Let $\lambda_k = (v_k, \eta_k)$ and represent the set of mismatch pdf parameters associated with node $N_k$. The parameter set, $\lambda_k$, is determined by maximizing the posterior probabilities described below, given a sequence of feature vectors, Y. It should be noted that once $\lambda_k$ is determined, the HMM parameter set $\theta$ is readily obtained using expressions [7] and [8] above.

In accordance with the inventive SMAP approach, the set $\{\lambda_0, \lambda_1, \ldots \lambda_k, \ldots, \lambda_{H-1}\}$ is used as the aforementioned "hierarchical priors" for $\lambda_H$, where $\lambda_0 = (O, I)$. The mismatch pdf parameter set $\lambda_0$ is assumed to be the prior for the parameter set $\lambda_1$ associated with root node 203, and the parameter set $\lambda_k$ associated with node $N_k$ is used as the prior for the parameter set $\lambda_{k+1}$ associated with its immediately subordinate node or child node, $N_{k+1}$.

The posteriori distribution for $\lambda_k$ may be expressed as follows:

$$p(\lambda_H|Y) = \int \ldots \int p(\lambda_H|\lambda_{H-1}, Y) \ldots p(\lambda_k|\lambda_{k-1}, Y) \ldots p(\lambda_1|\lambda_0, Y) d\lambda_1 \ldots d\lambda_{H-1}, \quad [9]$$

where $$p(\lambda_k|\lambda_{k-1}, Y) = \frac{p(Y|\lambda_k) p(\lambda_k|\lambda_{k-1})}{\int p(Y|\lambda_k) p(\lambda_k|\lambda_{k-1}) d\lambda_k}, \quad [10]$$

where $k = H, \ldots, 1$. Two approximations are employed here to simplify the evaluation of the posteriori distribution of [9]. The first approximation using the probability given by the maximum a posteriori (MAP) estimates is expressed as follows:

$$\int p(\lambda_1|\lambda_0, Y) p(\lambda_0) d\lambda_0 \sim p(\lambda_1|\hat{\lambda}_0, Y); \int p(\lambda_{k+1}|\lambda_k, Y) p(\lambda_k|\hat{\lambda}_{k-1}, Y) d\lambda_k \sim p(\lambda_{k+1}|\hat{\lambda}_k, Y), \quad [12]$$

where $$\hat{\lambda}_0 = \lambda_0; \quad [13]$$

$$\hat{\lambda}_k = \arg\max_{\lambda_k} p(\lambda_k|\hat{\lambda}_{k-1}, Y) = \arg\max_{\lambda_k} p(Y|\lambda_k) p(\lambda_k|\hat{\lambda}_{k-1}). \quad [14]$$

The second approximation is expressed as follows:

$$p(Y|\lambda_k) \sim N(Y|\lambda_k), \quad [15]$$

With these approximations, the MAP estimates of the mismatch pdf parameters for each node $N_k$ can be determined as follows:

$$v_0 = 0 \quad [16]$$

$$\eta_0 = I \quad [17]$$

$$v_k = \frac{\Gamma_k \tilde{v}_k + \psi_k v_{k-1}}{\Gamma_k + \psi_k} \quad [18]$$

-continued $$\eta_k = \frac{\xi \eta_{k-1} + \Gamma_k \tilde{\eta}_k + \frac{\psi_k \Gamma_k}{\psi_k + \Gamma_k}(\tilde{v}_k - v_{k-1})(\tilde{v}_k - v_{k-1})^T}{\xi + \Gamma_k} \quad [19]$$

$$\Gamma_k = \sum_{t=1}^{T} \sum_{m \in G_k} \gamma_{mt}, \quad [20]$$

where $G_k$ is a subset of G represented by node $N_k$; $(\tilde{v}_k, \tilde{\eta}_k)$ represents ML estimates for $(v_k, \eta_k)$. The parameters $\psi > 0$, and $\xi > 1$ are standard control parameters. By successively applying expressions [18] and [19] from the root node $N_1$ to a leaf node $N_H$ along the node sequence, the mean $v_H$ and the variance $\eta_H$ for the leaf node $N_H$ are obtained. These $v_H$ and $\eta_H$ are used as $v_p$ and $\eta_p$, respectively in expressions [7] and [8] to update the mixture components, in accordance with the inventive SMAP approach.

It should be noted that expression [18] can be rewritten for the leaf node $N_H$ as follows:

$$v_H = \sum_{k=1}^{H} w_k \tilde{v}_k, \quad [21]$$

where $$w_k = \frac{\Gamma_k}{\Gamma_k + \psi_k} \prod_{i=k+1}^{H} \frac{\psi_i}{\Gamma_i + \psi_i}. \quad [22]$$

From expression [21], the mean estimate $v_H$ in accordance with SMAP approach can be envisioned as the weighted sum of the ML estimates $\tilde{v}_k$ at different levels of tree structure 200. It should also be noted that at node $N_k$, the more adaptation data available, the larger is $\Gamma_k$, and thus $w_k$. In addition, the weight $w_k$ for $\tilde{v}_k$ at node $N_k$ decreases exponentially with the value of k. Thus, when the amount of available adaptation data is relatively small, the ML estimates $v_k$ corresponding to upper levels of tree structure 200 dominate in the mean estimate of [21]. On the other hand, when the amount of available adaptation data is relatively large, the ML estimates $v_k$ corresponding to lower levels thereof dominate in such a mean estimate.

The methodology for construction of tree structure 200 will now be described. The a priori knowledge about the embedded structure in the acoustic feature space should be used for the construction of tree structure 200 for the set of all mixture components, G. The tree construction is based on the methodology described, e.g., in: T. Watanabe et al., "Speech Recognition Using Tree-Structured Probability Density Function," *Proc. of ICSLP*-94, 1994, pp. 223–226. In this tree construction, a well known Kullback divergence between pdfs of the mixture components is used as the distance measure between the mixture components. Accordingly, the distance d(m,n) between two mixture components, say, $g_m$ and $g_n$, is determined as follows:

$$d(m, n) = \int (g_m(x) - g_n(x)) \log \frac{g_m(x)}{g_n(x)} dx \quad [23]$$

$$= \sum_i \left[ \frac{\sigma_m(i)^2 + (\mu_n(i) - \mu_m(i))^2}{\sigma_n(i)^2} + \frac{\sigma_n(i)^2 + (\mu_n(i) - \mu_m(i))^2}{\sigma_m(i)^2} \right],$$

where $\sigma_m(i)$ represents the $i^{th}$ diagonal element of covariance $S_m$. A node pdf is assigned to each node of tree structure 200. The pdf parameters for node $N_k$ to which mixture components $g_m^{(k)} = N(X|\mu_m^{(k)}, S_m^{(k)})$ belong, m=1, ..., $M_k$, are given as follows:

$$\mu_k(i) = \frac{1}{M_k} \sum_{m=1}^{M_k} \mu_m^{(k)}(i), \quad [24]$$

$$\sigma_k(i)^2 = \frac{1}{M_k} \left[ \sum_{k=1}^{M_k} \sigma_m^{(k)}(i)^2 + \sum_{m=1}^{M_k} \mu_m^{(k)}(i)^2 - M_k \mu_k(i)^2 \right]. \quad [25]$$

Figure 3:
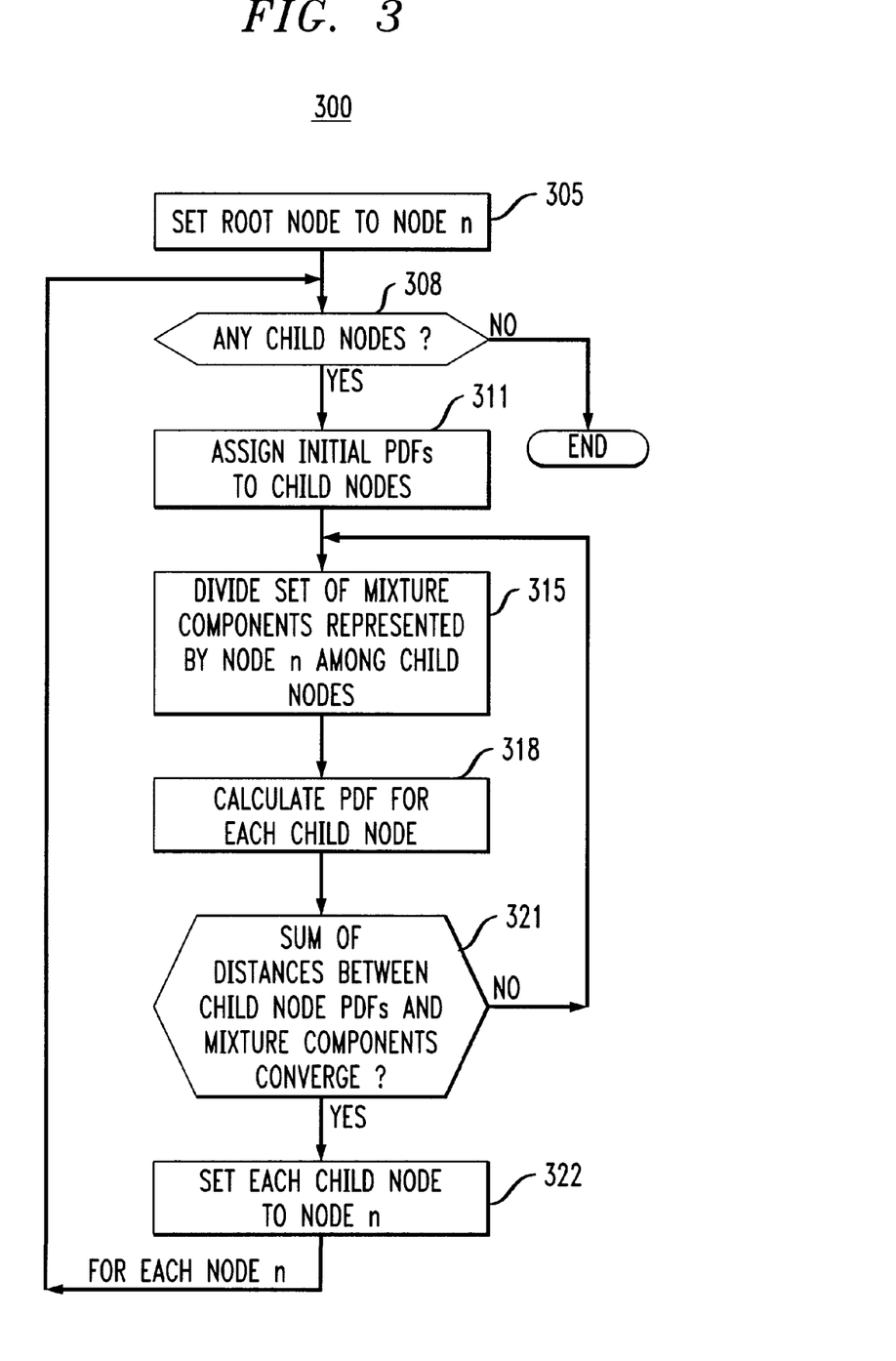
FIG. 3 is a flow chart depicting an algorithm for constructing the hierarchical structure of FIG. 2.

FIG. 3 illustrates conventional k-means clustering algorithm 300 for clustering the mixture components. According to this algorithm, the number of branches from each node and the number of levels in tree structure 200 are predetermined, and the clustering is recursively carried out. Specifically, root node 203 is initially set to be node n, as indicated at step 305. At step 308, it is determined whether node n has any child nodes. If node n has no child node, algorithm 300 comes to an end.

Otherwise, if node n has one or more child nodes, initial pdfs are assigned to the child nodes, respectively, using the well known min-max method, as indicated at step 311. At step 315, the set of mixture components represented by node n is divided among the child nodes by calculating the distances between the child node pdfs and the mixture components using expression [23]. Each mixture component is assigned to a child node whose pdf is closest to the mixture component. A pdf is then calculated at step 318 for each child node of node n based on expressions [24] and [25]. For each child node, the sum of the distances from the child node pdf to the mixture components represented by the child node is computed. The respective sums of distances for all of the child nodes of node n are added, resulting in a grand sum. It is then determined whether such a grand sum converges, as indicated at step 321. If the grand sum does not converge, algorithm 300 returns to step 315. Otherwise, if it converges, each child node is set to be a node n, as indicated at step 322. For each new node n, algorithm 300 returns to step 308.

The foregoing merely illustrates the principles of the invention. It will thus be appreciated that a person skilled in the art will be able to devise numerous systems which, although not explicitly shown or described herein, embody the principles of the invention and are thus within its spirit and scope.

For example, in the disclosed embodiment, the learning by speech recognition system 100 is unsupervised. That is, the speech provided by a user for the learning is uncontrolled. However, it will be appreciated that such learning may be supervised, in which the user may be allowed to speak only certain pre-selected words for the learning.

We claim:

1. Apparatus for recognizing selected speech based on acoustic models, the apparatus comprising:
   a processor responsive to selected data representing a sample of the selected speech for modifying the acoustic models; and
   a mechanism for defining a hierarchical structure which includes a plurality of levels, each level having one or more nodes thereon, each level in the structure arranged higher than every other level having a smaller number of nodes thereon than the other level, each node being associated with a probability measure which is determined based on at least the selected data, each node on each level having two or more nodes thereon being connected to a node on a second level higher than the level having two or more nodes thereon, the probability measure associated with each node on each level having two or more nodes thereon being a function of at least the probability measure associated with the node connected thereto on the second level, the acoustic models being modified based on at least the probability measure associated with each node on a selected level.

2. The apparatus of claim 1 wherein the acoustic models are in accordance with hidden Markov models (HMMs).

3. The apparatus of claim 2 wherein the HMMs include continuous density HMMs (CDHMMs).

4. The apparatus of claim 1 wherein the probability measure associated with each node is determined based also on second data representing a sample of at least second speech.

5. The apparatus of claim 4 wherein the probability measure associated with each node is derived from a difference between the sample of the selected speech and that of the at least second speech, the difference being a function of the selected data and second data.

6. The apparatus of claim 1 wherein the acoustic models are modified in response also to a recognized version of the sample of the speech.

7. The apparatus of claim 1 wherein the acoustic models are characterized by a plurality of parameters, each node representing a set containing one or more of the parameters.

8. The apparatus of claim 7 wherein the selected level is arranged lowest of all of the levels, each node on the selected level representing a set containing a different one of the plurality of parameters.

9. The apparatus of claim 8 wherein the probability measure associated with each node on the selected level is used to modify the parameter in the set represented by the node.

10. The apparatus of claim 8 wherein the set represented by each node on a level other than the selected level includes the sets represented by the nodes on the selected level which are connected to the node.

11. A system for recognizing selected speech based on acoustic models, which are characterized by a plurality of parameters, the system comprising:
    a device for providing selected data representing a sample of the selected speech;
    a processor for defining a structure which includes a plurality of levels, each level including one or more nodes, each node being associated with a respective probability measure, which is derived from at least the selected data;
    a mechanism for identifying at least one sequence of nodes from different levels; and
    an adaptor for modifying at least one of the parameters based on at least the probability measure associated with a selected node in the sequence, the probability measure associated with the selected node being a function of the probability measure associated with every other node in the sequence.

12. The system of claim 11 wherein the levels in the structure are arranged in order in a direction, a level arranged further in the direction including a larger number of nodes, the selected node being from the level arranged furthest in the direction of all of the levels.

13. The system of claim 11 wherein the probability measure associated with the selected node is also a function of at least one weight for scaling the probability measure associated with a second node in the sequence, the weight varying with a position of the level where the second node is from, relative to positions of other levels in the structure.

14. The system of claim 13 wherein the weight also varies with an amount of the data.

15. The system of claim 11 wherein the acoustic models are in accordance with HMMs.

16. The system of claim 11 wherein the HMMs include CDHMMs.

17. The system of claim 11 wherein the respective probability measure is derived also from second data representing a sample of at least second speech.

18. The apparatus of claim 17 wherein the respective probability measure is determined based on a difference between the sample of the selected speech and that of the at least second speech, the difference being a function of the selected data and second data.

19. The system of claim 11 wherein the acoustic models are modified based also on a recognized version of the sample of the speech.

20. A method for use in an apparatus for recognizing selected speech based on acoustic models, the method comprising:

modifying the acoustic models in response to selected data representing a sample of the selected speech; and defining a hierarchical structure which includes a plurality of levels, each level having one or more nodes thereon, each level in the structure arranged higher than every other level having a smaller number of nodes thereon than the other level, each node being associated with a probability measure which is determined based on at least the selected data, each node on each level having two or more nodes thereon being connected to a node on a second level higher than the level having two or more nodes thereon, the probability measure associated with each node on each level having two or more nodes thereon being a function of at least the probability measure associated with the node connected thereto on the second level, the acoustic models being modified based on at least the probability measure associated with each node on a selected level.

21. The method of claim 20 wherein the acoustic models are in accordance with HMMs.

22. The method of claim 21 wherein the HMMs include continuous density CDHMMs.

23. The method of claim 20 wherein the probability measures are determined based also on second data representing a sample of at least second speech.

24. The method of claim 23 wherein the probability measure associated with each node is derived from a difference between the sample of the selected speech and that of the at least second speech, the difference being a function of the selected data and second data.

25. The method of claim 20 wherein the acoustic models are modified in response also to a recognized version of the sample of the speech.

26. The method of claim 20 wherein the acoustic models are characterized by a plurality of parameters, each node representing a set containing one or more of the parameters.

27. The method of claim 26 wherein the selected level is arranged lowest of all of the levels, each node on the selected level representing a set containing a different one of the plurality of parameters.

28. The method of claim 27 wherein the probability measure associated with each node on the selected level is used to modify the parameter in the set represented by the node.

29. The method of claim 27 wherein the set represented by each node on a level other than the selected level includes the sets represented by the nodes on the selected level which are connected to the node.

30. A method for use in a system for recognizing selected speech based on acoustic models, which are characterized by a plurality of parameters, the method comprising:

providing selected data representing a sample of the selected speech;

defining a structure which includes a plurality of levels, each level including one or more nodes, each node being associated with a respective probability measure, which is derived from at least the selected data;

identifying at least one sequence of nodes from different levels; and modifying at least one of the parameters based on at least the probability measure associated with a selected node in the sequence, the probability measure associated with the selected node being a function of the probability measure associated with every other node in the sequence.

31. The method of claim 30 wherein the levels in the structure are arranged in order in a direction, a level arranged further in the direction including a larger number of nodes, the selected node being from the level arranged furthest in the direction of all of the levels.

32. The method of claim 30 wherein the probability measure associated with the selected node is also a function of at least one weight for scaling the probability measure associated with a second node in the sequence, the weight varying with a position of the level where the second node is from, relative to positions of other levels in the structure.

33. The method of claim 32 wherein the weight also varies with an amount of the data.

34. The method of claim 30 wherein the acoustic models are in accordance with HMMs.

35. The method of claim 30 wherein the HMMs include CDHMMs.

36. The method of claim 30 wherein the respective probability measure is derived also from second data representing a sample of at least second speech.

37. The method of claim 36 wherein the respective probability measure is determined based on a difference between the sample of the selected speech and that of the at least second speech, the difference being a function of the selected data and second data.

38. The method of claim 30 wherein the acoustic models are modified based also on a recognized version of the sample of the speech.

* * * * *